April 7, 1964 C. FIELD 3,127,756
ICE MAKING AND STORAGE FACILITY
Filed May 12, 1961 4 Sheets-Sheet 1

INVENTOR.
Crosby Field
BY
Curtis, Morris, & Safford
ATTORNEYS

April 7, 1964
C. FIELD
3,127,756
ICE MAKING AND STORAGE FACILITY
Filed May 12, 1961
4 Sheets-Sheet 2
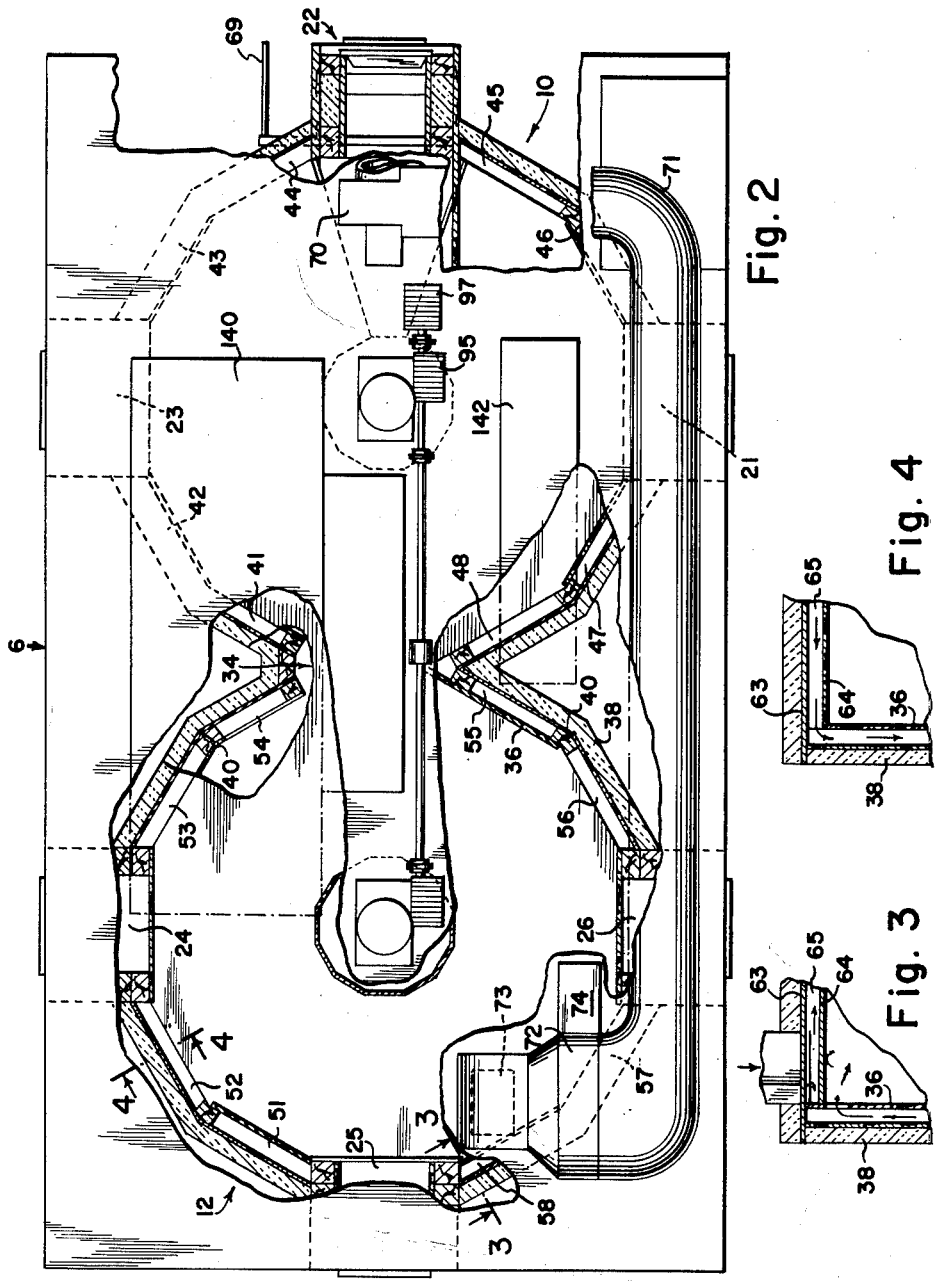
INVENTOR.
Crosby Field
BY
Curtis, Morris, & Safford
ATTORNEYS April 7, 1964   C. FIELD   3,127,756
ICE MAKING AND STORAGE FACILITY
Filed May 12, 1961   4 Sheets-Sheet 3

INVENTOR.
Crosby Field
BY
*Curtis, Morris, & Safford*
ATTORNEYS

INVENTOR.
Crosby Field

United States Patent Office 3,127,756
Patented Apr. 7, 1964

3,127,756
ICE MAKING AND STORAGE FACILITY
Crosby Field, Brooklyn, N.Y., assignor to Flakice Corporation, Brooklyn, N.Y., a corporation of Delaware
Filed May 12, 1961, Ser. No. 109,627
13 Claims. (Cl. 62—344)

This invention relates to refrigeration and the refrigerated storage and dispensing of fragmented ribbon ice. More in particular, the invention relates to improved refrigerated storage bins and mechanisms for storing ice therein and for discharging it when desired.

An object of this invention is to provide refrigerated storage facilities which are superior to those previously available. A further object is to provide an improved storage bin for fragmented ice. A further object is to provide an improved icemaking and storage facility which is formed of standardized components, but which may be constructed in various sizes. A further object is to provide ice-handling mechanisms, particularly for distributing crisp, stiff, sub-cooled ribbon ice. A further object is to provide such mechanisms which may be utilized to receive the ice and to discharge it in a controlled manner. These and other objects will be in part obvious, and in part pointed out below.

In the drawings:

FIGURE 2 is a plan view of the upper floor of the embodiment of FIGURE 1, with parts broken away;

Figure 5:
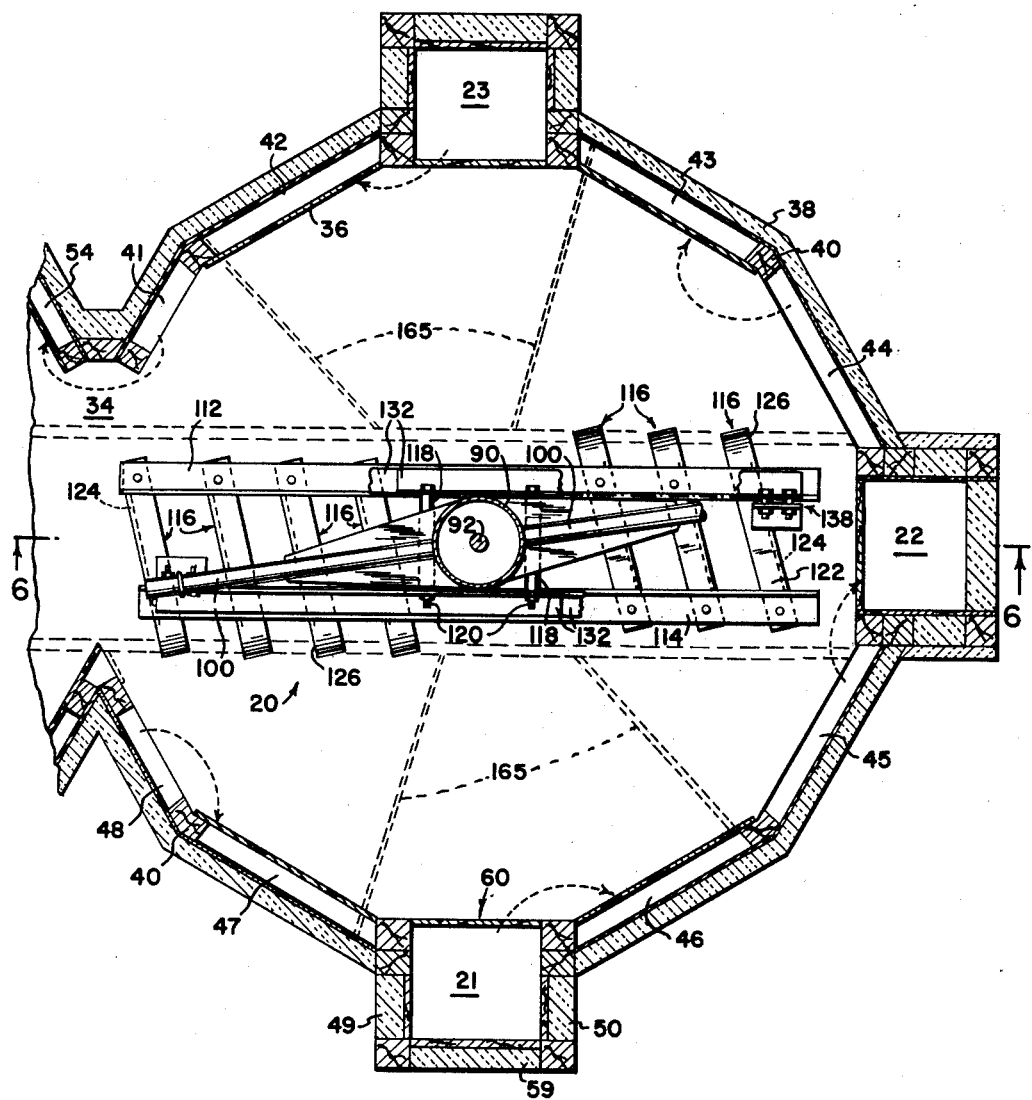
Figure 6:
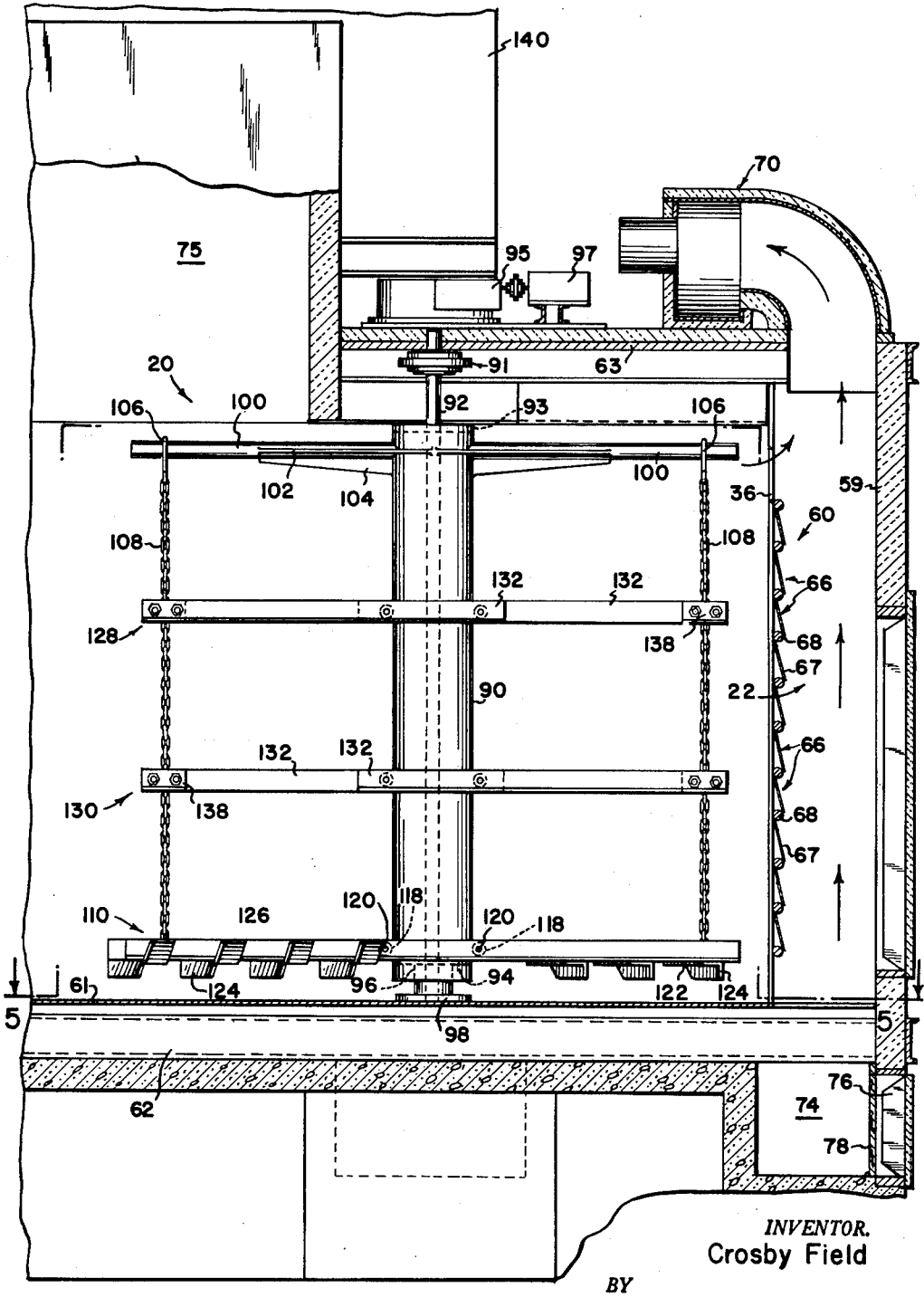

FIGURES 3 and 4 are sectional views on the lines 3—3 and 4—4 of FIGURE 2;

FIGURE 5 is a horizontal section on the line 5—5 of FIGURE 6; and

FIGURE 6 is a vertical section on the line 6—6 of FIGURE 5.

Figure 1:
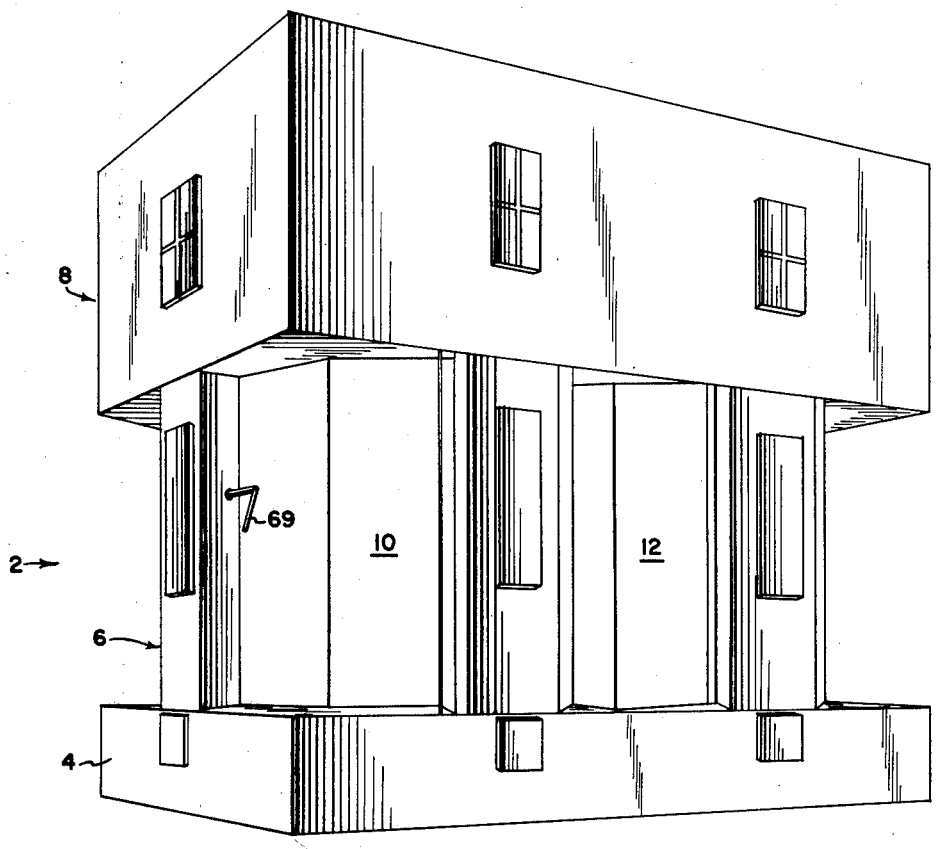
FIGURE 1 is a perspective view of one embodiment of the invention.

Referring to FIGURE 1 of the drawings, the illustrative embodiment of the invention comprises an ice-making and storage facility 2, which is positioned upon an elevated foundation 4, and comprises an ice storage section 6, and an ice-making and equipment section 8. The ice storage section 6 (see also FIGURE 2) is formed by two identical storage units 10 and 12 which are interconnected, and each of which is basically a twelve-sided prism. Each of units 10 and 12 provides an ice bin which is adapted to be filled with ice, and the storage space is maintained at a temperature below the freezing temperature of the ice, so that the ice does not tend to melt and refreeze at the side and bottom walls of the bin structure. Each of these units also includes an ice rake assembly 20 (see FIGURES 5 and 6), which is rotatably mounted at the center of its unit. These assemblies are operated to maintain the upper surface of the ice fairly level, and they also aid in discharging ice from the bins. Bin 10 has three discharge vestibules 21, 22 and 23, and unit 12 (FIGURE 2) has three similar vestibules 24, 25 and 26.

Units 10 and 12 are generally shaped as prisms with twelve sides by identical walls and the vestibules. However, when two units are mounted together, as in the illustrative embodiment, one vestibule is omitted, and the adjacent wall structures are of modified construction, as shown. In this way, the two units are interconnected by an opening to form a common ice storage bin or chamber. In each unit, the bin proper is formed by an inner wall 36 (see FIGURES 5 and 6) by thin wood panels and a heat-insulated outer wall 38. These walls 36 and 38 are mounted upon wood uprights 40, and are spaced from each other so as to form vertical air passageways numbered from 41 to 48, inclusive, each of which is open at the top and bottom. Unit 12 (FIGURE 2) is identical in structure with unit 10, with vertical passageways 51 to 58. Each of the vestibules 21 to 26 is formed by two heat-insulated wood walls 49 and 50, a heat-insulated door 59 and a fixed wall above and below it, a swingable shutter gate assembly 60 which separates the vestibule from the bin. Each of the vestibules extends vertically from the top of the bin down below the bottom of the bin, so that it provides a vertical air passageway.

During operation, sub-cooled or chilled air is circulated through the passageways 41 to 48 and 51 to 58, and also through the vestibules 21 to 26 so as to pick up the heat from the outside. As will be explained more fully below, air passes downwardly through passageways 41, 44, 45, 48, 52, 53, 56 and 57, and vestibules 21, 23 and 25; and air passes upwardly through passageways 42, 43, 46, 47, 51, 54, 55 and 58, and vestibules 22, 24 and 26. Referring to FIGURE 6, the bottom wall 61 is supported upon beams 62 so as to provide air passageways through which the chilled air is also circulated. Similarly, below the insulated top wall 63, there is a false ceiling 64 which provides a passageway 65 for the circulation of the chilled air throughout the top of the entire bin assembly. In this way, the inner wall 36 and the shutter gate assemblies 60, and the top and bottom wall surfaces, are maintained below the freezing temperature of ice so that the ice does not tend to melt when coming in contact with the wall and baffle surfaces. This insures against the building up of ice crusts and other formations within the bin.

As shown in FIGURE 4, the false ceiling 64 is blocked off adjacent vestibule 22, so that air may pass from the top of the bin into the top of the vestibule. Also, air may pass from each of the other vestibules into the bin through the shutter assembly, except where such passage is prevented or retarded by the presence of ice adjacent the shutters. Referring to FIGURE 6, mounted above vestibule 22 is a motor-driven fan 70, which draws air from the top of the vestibule and discharges it (see also FIGURES 2, 3 and 4) through a conduit 71 and an air-cooling coil 72 and an opening 73 into passageway 65 which is formed along the top of units 10 and 12 by the false ceiling 64. Coil 72 is the evaporator of a refrigeration unit 74. From passageway 65, chilled air passes downwardly along the outer walls of the bin, and thence through passageways beneath the floor of the bins and upwardly along the outer walls to the top of the bins. Uniform air distribution is insured by radial baffles 165 (shown in broken lines in FIGURE 5) beneath the bin floor which direct each downflowing stream of air into an adjacent air-upflow passageway, the pasageways being interconnected as follows: 52 and 51, 53 and 24, 41 and 54, 23 and 42, 44 and 43, 45 and 22, 21 and 46, 48 and 47, 56 and 55, 57 and 26, and 25 and 58. The air flows across the top of the bins and is then withdrawn by the fan and recirculated. The air circulation is at a sufficient rate to maintain very stable temperature conditions throughout the entire ice storage and handling structure. Also, the amount of moisture in the air is stabilized so that there is no objectionable sublimation of the ice.

The shutter gate assembly 60 (FIGURE 6) is formed by a vertically-spaced array of shutter gates 66, each of which is formed by a shutter plate 67 welded at its upper edge to a pivot rod 68. In the closed position shown, each shutter plate closes the opening beneath its pivot, and when the pivot is turned by a handle 69 (FIGURE 2), the shutter plate is swung away so as to open the space (FIGURE 6), for the flow of ice. The pivot rods are mechanically interconnected so that the shutter gates are opened and closed simultaneously, although separate individual or group operations may be provided.

Directly beneath vestibule 22 is an ice-removal chamber 74, which has a heat-insulated door 76 and an inner ice-barrier door 78. When ice is discharged into vestibule 22, it falls into chamber 74 from which it is removed by opening doors 76 and 78. A deflecting chute may be projected into chamber 74 to deflect the falling ice outwardly, or the bottom wall of the chamber may slant outwardly, rather than the horizontal wall shown.

The ice rake assembly 20 has a central vertical cylindrical post 90 and a concentric shaft 92 which are rigidly interconnected by a pair of disks 93 and 94 closing the top and bottom of the post and welded to the post and the shaft. The ice rake assembly is supported from the bottom by a thrust bearing 96 and a fixed base plate 98 on the bin floor. Disk bearing 94 and thrust bearing 96 are positioned upwardly from the end of the post to prevent ice from contacting the bearing. At the top, shaft 92 projects through a fixed bearing 91, and it is connected to a drive unit 95, to which power is supplied by a motor 97 (see also FIGURE 2). In this embodiment, motor 97 drives both of the ice rake assemblies 20.

Rigidly mounted upon the upper end of post 90 are two rigid arms 100 which are in alignment, and which extend substantially the diameter of the bin. Arms 100 are welded to the post and are reinforced at the sides and bottom by webs 102 and 104 welded to the arms and the post. Supported from the end of each of arms 100 by a double-loop link 106 is a chain 108 which hangs downwardly and supports one end of a sled rake 110. Sled rake 110 (see also FIGURE 5) is formed by a pair of parallel angle bars 112 and 114, seven ice-deflecting runners 116 which are rigidly bolted to the angle bars, a pair of spacer tubes 118, and a pair of clamping bolts 120 extending through the tubes and the angle bars and clamping the angle bars rigidly to the ends of the tubes. The spacing between the angle bars and between tubes 120 is sufficient to provide clearance around post 90 so that the sled rake may turn on the post and may move freely up and down the post without binding. The sled rake is a rigid, sturdy construction which will withstand considerable abuse. Each of the ice-positioning runners 116 is formed of a steel angle bar, with a horizontal portion 122 clamped to the two angle bars 112 and 114 and a vertical portion 124 projecting downwardly and providing an ice-pusher flange. Integral with the horizontal portion 122, is an upwardly extending portion 126 which presents a leading runner surface when the unit is rotated (counterclockwise in FIGURE 5). In this embodiment, there are three runners at the right (FIGURE 5) and four runners at the left, and the runners in each group are equally spaced. However, the runners at the right are positioned radially so that they move along circular paths intermediate the circular paths of the runners at the left. Also, each of the runners is positioned at an angle of less than 90° to the radius from shaft 92 intersecting its center, with the leading end at a lesser radius than the trailing end. Therefore, when the sled rake is resting upon the top of a body of ice, each of the runners tends to push the ice outwardly a radial distance equal to the difference in the radii of the leading and trailing ends of its ice-pusher flange 124.

Equally spaced vertically between the arms 100 and the sled rake are two spacer assemblies 128 and 130. Each of the spacer assemblies has a pair of arms 132 which are rigidly attached together at post 90 by a tube and bolt structure identical with that formed by tubes 120 and 118 of the sled rake, so that the spacer assembly may turn and move vertically on post 90. As shown best in FIGURE 5, arms 132 project tangentially with respect to the post. The outer end of each arm 132 is secured to the adjacent chain 108 by a clamp 138, formed by an angle bar and a pair of bolts In this way, the chains are held at the fixed diameter of the connections with arms 100 and sled rack 110.

Assuming now that the bins are empty and the ice-maker is started, the ice is discharged into both of the bins through the chute 75. The ice flows freely into both bins, and all of the surfaces which the ice touches are below the freezing temperature so that no ice is melted. At predetermined intervals, motor 97 is operated for a short time so as to rotate the two ice rake assemblies 20. Initially, each of the sled rakes 110 drags the ice throughout the floor of its bin. As the operation continues, and the layer of ice increases in depth, the sled rake rides upwardly upon the ice, and this is insured by the upturned leading portions 126 on the runners. The elevating of the sled rake shortens the vertical distance between it and the arms 100, and this tends to cause the sled rake to trail the arms in the rotary movement. The spacer assemblies 128 and 130 also move upwardly and then hold the chains outwardly and transmit the rotary pulling action to the ends of the sled rake. The starting and stopping of motor 97 is so controlled that the sled rakes maintain the ice in substantially level condition at all times. If no ice is withdrawn from the bins, the continued operation fills the bins, and the sled rakes and the spacer assemblies ride upwardly to the top of the bins. When ice is withdrawn from one of the vestibules so as to reduce the level of ice in the adjacent portion of its bin, a subsequent operation of the ice rake assemblies 20 levels the ice again, and also tends to move ice through opening 34 from one bin to the other when that is desirable.

In this embodiment, a single icemaker 140 produces the ice and discharges it directly through the chute 75 into the top of the bins. As shown in FIGURE 2, a water chiller 142 is provided which cools the water passing to the icemaker 140.

With the arrangement shown, three vestibules are available for withdrawing ice from each of the units 10 and 12. However, as indicated above, the ice level is maintained substantially the same in both units, even though more is withdrawn from one than the other. This particular construction permits the building up of large ice-making and storage facilities from standard unit constructions. For example, four units may be positioned in a square and interconnected, or the units may be positioned and interconnected in the form of a rectangle, triangle, star, cross, or they may all be in a single line.

Motor 97, which operates the ice rake assemblies 20, is operated continuously by closing a switch (not shown), and it is operated intermittently by an automatic timer whenever the icemaker is operated, so as to distribute and level the ice and prevent the ice from burying the ice rakes. It is desirable to keep the vestibules clear of ice except during the actual time when ice is being withdrawn from the bins. Accordingly, the shutter gates in each vestibule are opened only when the doors 76 and 78 for that vestibule are opened. Also, the ice rake assemblies are operated only intermittently during the production of the ice, and continuously only when ice is being withdrawn from one or more of the vestibules. The air-colling unit and fan 70 are operated continuously, as long as ice is stored. However, the heat leakage into the units 10 and 12 is very low, and the refrigeration unit may be turned off thermostatically whenever the temperature coil 72 is low enough to insure that the air temperature is properly cooled.

As many possible embodiments may be made of the above invention and as changes might be made in the embodiment above set forth, it is to be understood that the matter hereinbefore set forth or shown in the accompanying drawings is to be interpreted illustratively and not in a limiting sense.

I claim:
1. An ice-making and storage facility comprising, the combination of, an icemaker for producing ice in the form of sub-cooled fragments, a storage bin formed by heat-insulated walls with air passageways between the insulation and the ice storage zone, means to cool and circulate air through said passageways to maintain the surfaces which are contacted by the ice in said zone at a temperature below the freezing temperature of the ice, said last-named means including a refrigeration system having an air-cooling coil through which the air is circulated, an ice outlet chamber adjacent the periphery of said zone from which ice is withdrawn, and an ice rake assembly centrally positioned within said zone and comprising a rotatable sled rake and supporting means for supporting and rotating said sled rake about the central axis of said bin including rigid arm means projecting radially from said central axis and vertical chain means connecting said rigid arm means to said sled rake adjacent the periphery of said bin, said assembly including radial spacer means holding said chain means adjacent said periphery, said sled rake and said spacer means being freely moveable upwardly whereby rotary forces are imparted tangentially to said sled rake and it is adapted to ride upwardly upon the ice as it is rotated and to divert the ice toward said ice outlet chamber.

2. In apparatus of the character described, an ice storage bin having inner walls and insulated outer walls spaced therefrom and providing air passageways therebetween, refrigeration means to cool a stream of air, means to circulate a stream of air through said refrigeration means and thence through said air passageways thereby to maintain said inner walls at a temperature below the freezing temperature of the ice to be stored, a central post positioned within said bin, a sled rake mounted upon said post and adapted to rotate and move vertically upon said post, and rotary means including a drag chain connection with said sled rake and adapted to turn said sled rake about said post thereby to cause the sled rake to ride upwardly as the thickness of the layer of the ice in the bin increases.

3. Apparatus as described in claim 2, wherein said sled rake comprises a pair of parallel bars and a plurality of runners mounted thereon and adapted to contact the surface of the ice.

4. Apparatus as described in claim 3, wherein each of the runners comprises a runner portion which is adapted to rest upon the surface of the body of ice and a vertical ice-pusher portion which is adapted to project into the body of ice and impart a radial pushing action thereto.

5. Apparatus as described in claim 4, wherein said drag chain means comprises a pair of chains connected at a substantial radius from the center of rotation, and spacer means attached intermediate the ends of said chains and adapted to hold the chains away from said post.

6. Apparatus as described in claim 5, wherein said spacer means includes means mounted to rotate and move vertically upon said post and arms rigidly holding said chains at a predetermined radius at the points of attachment.

7. Apparatus as described in claim 2, wherein said sled rake includes a rigid structure surrounding said post and formed by a pair of angle bars and a pair of cylindrical spacers rigidly mounted therebetween.

8. Apparatus as described in claim 2, wherein the structure forms passageways providing a single flow path for the air from the top of said bin through said refrigeration means and thence to a plurality of parallel flow paths along the outer walls of the bin.

9. Apparatus as described in claim 2, which includes, means forming a vestibule adjacent said bin, a plurality of pivoted plates which are positioned between said bin and said vestibule and are adapted to move from a closed position to an open position wherein ice flows into the vestibule, and means to receive the ice from the vestibule.

10. In apparatus of the character described, ice-handling means comprising, vertical means providing a rigid cylindrical surface, a sled rake mounted around said surface and adapted to rotate and move vertically therealong, means including a pair of drag chains attached to said sled rake and adapted to turn said sled rake around its axis and to impart a lifting action as a layer of ice builds up beneath the sled rake, and spacer means holding said drag chains at a predetermined radius from the axis of rotation.

11. Apparatus as described in claim 10, wherein said sled rake comprises a pair of parallel frame members and a plurality of runners each of which is adapted to slide upwardly when encountering ice in its rotary movement and each of which diverts the ice radially outwardly.

12. Apparatus as described in claim 11, wherein said runners are positioned in two groups upon the opposite sides of the center of rotation and wherein the runners of one group move along paths intermediate the paths of movement of the runners in the other group.

13. An ice storage facility comprising, the apparatus as described in claim 2 and a second ice storage bin as described in claim 2, each of said bins being a 12-sided figure and said bins being interconnected by an open horizontal passageway whereby the operation of said sled rakes causes the ice to flow between the bins.

References Cited in the file of this patent

UNITED STATES PATENTS

| | | |
|---|---|---|
| 875,876 | Winchell | Jan. 7, 1908 |
| 1,257,161 | Walters | Feb. 19, 1918 |
| 2,181,898 | Kastler | Dec. 5, 1939 |
| 2,430,203 | Bailey | Nov. 4, 1947 |
| 2,467,933 | Gruhn | Apr. 19, 1949 |
| 2,517,686 | Larkin | Aug. 8, 1950 |
| 2,644,317 | Haywood | July 7, 1953 |
| 2,724,949 | Kattis | Nov. 29, 1955 |
| 2,735,591 | Branchflower | Feb. 21, 1956 |
| 2,791,887 | Hennig | May 14, 1957 |
| 2,907,186 | Barroero | Oct. 6, 1959 |